US008854374B2

(12) United States Patent
Martin et al.

(10) Patent No.: US 8,854,374 B2
(45) Date of Patent: Oct. 7, 2014

(54) TESSELLATION PATTERNS

(75) Inventors: Todd Martin, Orlando, FL (US);
Mangesh Nijasure, Orlando, FL (US);
Vineet Goel, Winter Park, FL (US);
Jason David Carroll, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 134 days.

(21) Appl. No.: 13/336,635

(22) Filed: Dec. 23, 2011

(65) Prior Publication Data
US 2013/0162651 A1 Jun. 27, 2013

(51) Int. Cl.
*G06T 11/20* (2006.01)
(52) U.S. Cl.
USPC .......................................... 345/441
(58) Field of Classification Search
USPC .......................................... 345/441
See application file for complete search history.

(56) References Cited

U.S. PATENT DOCUMENTS 6,707,452 B1 * 3/2004 Veach ........................... 345/423
2011/0057931 A1 * 3/2011 Goel et al. .................... 345/423

OTHER PUBLICATIONS

Moreton, Henry. "Watertight tessellation using forward differencing." Proceedings of the ACM SIGGRAPH/EUROGRAPHICS workshop on Graphics hardware. ACM, 2001.*
Moreton, H., "Watertight Tessellation using Forward Differencing," *HWWS '01*:25-32, Association for Computing Machinery, United States (2001).
International Search Report and Written Opinion for International Application No. PCT/US2012/070985, European Patent Office, Netherlands, mailed on Mar. 26, 2013.

* cited by examiner

*Primary Examiner* — David Zarka
*Assistant Examiner* — Vu Nguyen
(74) *Attorney, Agent, or Firm* — Sterne, Kessler, Goldstein & Fox P.L.L.C.

(57) ABSTRACT

Methods, systems, and computer readable media embodiments are disclosed for generating primitives in a grid. Embodiments include generating a set of vertices in a section of the grid, selecting one or more vertices in the set of vertices in an order based on a proximity of the vertices to a boundary edge of the grid, and generating primitives based on the order of the selected vertices.

17 Claims, 10 Drawing Sheets

TESSELLATION PATTERNS

BACKGROUND

1. Field of the Invention

The present invention is generally directed to computing systems. More particularly, the present invention is directed to computing systems performing graphics processing operations.

2. Background Art

A graphics processing unit (GPU) is a special-purpose integrated circuit optimized for graphics processing operations. GPUs are often incorporated into computing devices (e.g., personal computers, rendering farms or servers, handheld devices, digital televisions, etc.) and are used for executing applications with demanding graphics processing needs, such as, for example, video game applications.

Several layers of software exist between an end-user application and a GPU. The end-user application communicates with an application programming interface (API). An API allows the end-user application to output graphics data and commands in a standardized format, rather than in a format that is dependent on the GPU. The API communicates with a driver which translates standard code, received from the API, into a native format of instructions understood by the GPU. The driver is typically written by the manufacturer of the GPU.

In most modern GPU implementations, the processing of graphics operations is broken into various functional units, each located within a different stage of a processing pipeline. A GPU may implement a unified shader model in which a sequence of shaders is implemented. One of these shaders can be, for example, a tessellation shader. The tessellation shader enables a user to input higher order surfaces and have the GPU hardware tessellate a geometric patch into a grid of primitives for further processing. Typically, input to the GPU is provided in the form of a set of vertices, along with connectivity information defining an interconnection of the vertices. As understood by one of skill in the art, the set of vertices, along with associated connectivity information, defines a geometric primitive.

Geometric primitives and vertices are produced, for example, within the tessellation shader. The sequence, or order, in which the tessellation engine generates the primitives and vertices is known by those of skill in the art as a walk pattern. A traditional tessellation shader generates vertices of the grid of primitives by following a traditional serpentine like walk pattern. This serpentine walk pattern typically produces a triangle strip and provides approximately one primitive per vertex. The rate of one primitive per vertex results in the need to re-process vertices. This approach is inefficient in that it duplicates work and results in slower overall frame rates.

SUMMARY OF EMBODIMENTS OF THE INVENTION

Therefore, what is needed is a method and system for generating primitives in a more efficient manner.

Although GPUs, accelerated processing units (APUs), and general purpose use of the graphics processing unit (GPGPU) are commonly used terms in this field, the expression "accelerated processing device (APD)" is considered to be a broader expression. For example, an APD refers to any cooperating collection of hardware and/or software that performs those functions and computations associated with accelerating graphics processing tasks, data parallel tasks, or nested data parallel tasks in an accelerated manner with respect to resources such as conventional central processing units (CPUs), conventional GPUs, and/or combinations thereof.

An embodiment of the present invention, in certain circumstances, provides an APD with a tessellation engine to generate vertices in a manner that is more efficient from a hardware perspective than the serpentine walk pattern noted above.

In an embodiment, a computer-implemented method for generating primitives in a grid includes generating a set of vertices in a section of the grid. One or more vertices in the set of vertices is selected in an order based on the proximity of the vertices to a boundary edge of the grid, and primitives are generated based on the order of the selected vertices.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

Figure 1:
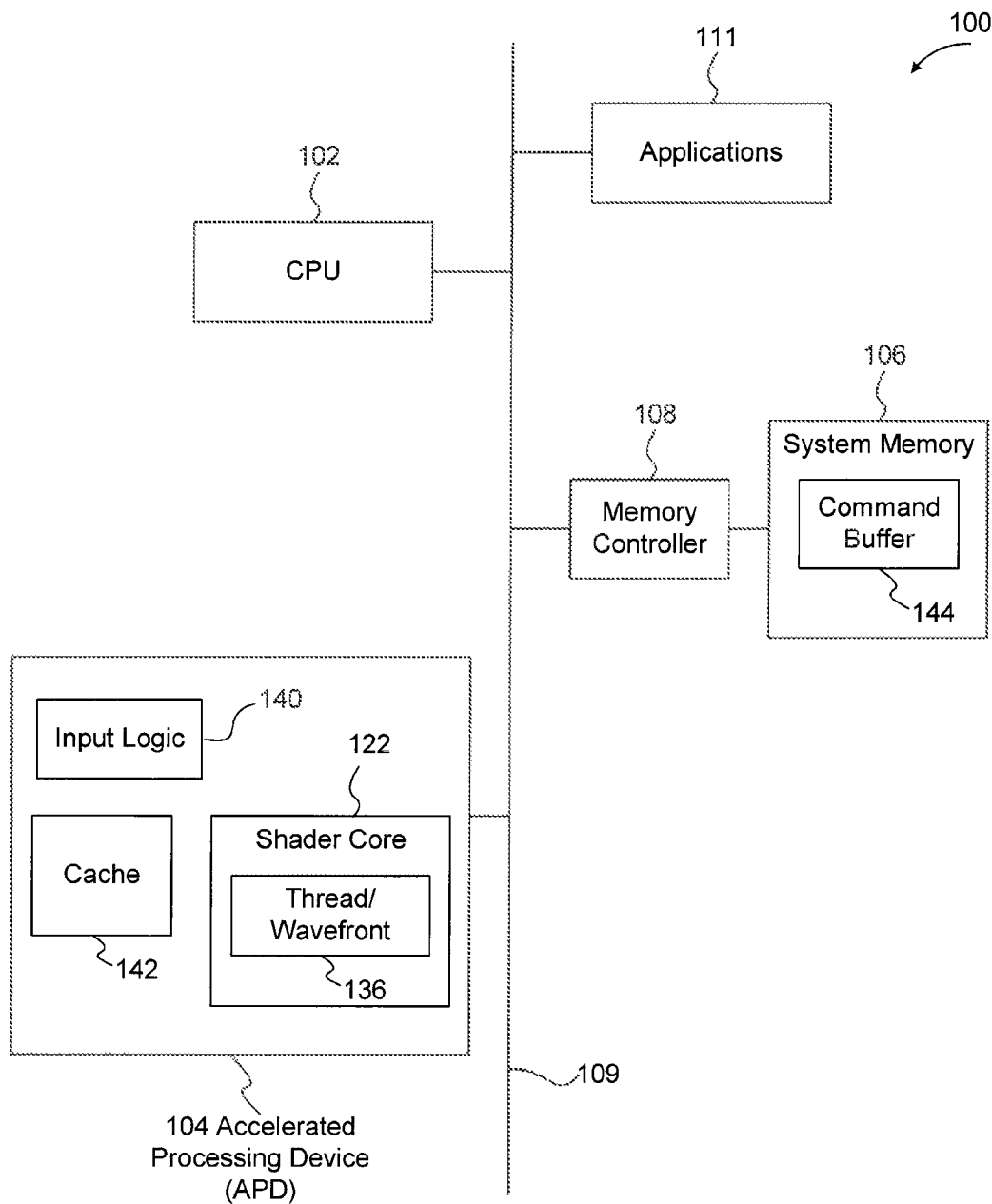
FIG. 1 is a block diagram of an example computing system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION OF THE EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustration of an example computing system 100 in accordance with an embodiment of the present invention. Computing system 100 includes a CPU 102 and an APD 104. CPU 102 can include one or more single or multi core CPUs. In one embodiment of the present invention, system 100 is formed on a single silicon die or package, combining CPU 102 and APD 104 to provide a unified programming and execution environment. This environment enables APD 104 to be used as fluidly as CPU 102 for some programming tasks. However, it is not an absolute requirement of this invention that CPU 102 and APD 104 be formed on a single silicon die. In some embodiments, it is possible for them to be formed separately and mounted on the same or different substrates.

Computing system 100 also includes a memory 106 that may be accessed by CPU 102 and APD 104. Access to memory 106 can be managed by a memory controller 108, which is coupled to memory 106. For example, requests from CPU 102, or from other devices, for reading from or for writing to memory 106 are managed by memory controller 108.

CPU 102 can include (not shown) one or more of a control processor, field programmable gate array (FPGA), application specific integrated circuit (ASIC), or digital signal processor (DSP). CPU 102, for example, executes control logic that controls the operation of computing system 100. In this illustrative embodiment, CPU 102 initiates and controls the execution of applications 111 by, for example, distributing the processing associated with that application across CPU 102 and other processing resources, such as APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 suited for execution of data-parallel tasks such as are common in graphics processing. Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a single SIMD engine can be referred to as a wavefront 136. The width of a wavefront is a characteristic of the hardware SIMD engine. As referred to herein, a workgroup is a collection of related work-items that execute on a single compute unit. The work-items in the group execute the same kernel and share local memory and workgroup barriers.

APD 104 includes input logic 140 and a cache 142. In one example, CPU 102 inputs commands based on applications 111 into appropriate command buffers 144. As referred to herein, an application is the combination of the program parts that will execute on the compute units within the CPU and APD. A plurality of command buffers can be maintained with each process scheduled for execution on APD 104. Input logic 140 controls the processing within APD 104. Input logic 140 may retrieve commands to be executed from command buffers 144 in memory 106 and coordinate the execution of those commands on APD 104.

Cache 142 stores data that is frequently used by shader core 122. In an embodiment, cache 142 comprises one or more level 1 (L1) caches and one or more level 2 (L2) caches, wherein the L1 caches have less storage capacity but provide faster data access than the L2 caches.

Memory 106 can include non-persistent memory such as dynamic random access memory (DRAM), not shown. Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102. The term "processing logic" or "logic," as used herein, refers to control flow commands, commands for performing computations, and commands for associated access to resources.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

Components of system 100 can be implemented as hardware, firmware, software, or any combination thereof. A person of skill in the art will understand, upon reading this description, that system 100 can include more or fewer components than that shown in FIG. 1. For example, computing system 100 can include one or more input interfaces, non-volatile storage, output interfaces, network interfaces, and displays or display interfaces. For example, although not specifically illustrated in FIG. 1, computing system 100 may also include or be coupled to a display device (e.g., cathode-ray tube, liquid crystal display, plasma display, or the like). The display device is used to display content to a user (such as, when computing system 100 comprises a computer, video-game console, or handheld device).

In some embodiments, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include an APD.

Figure 2:
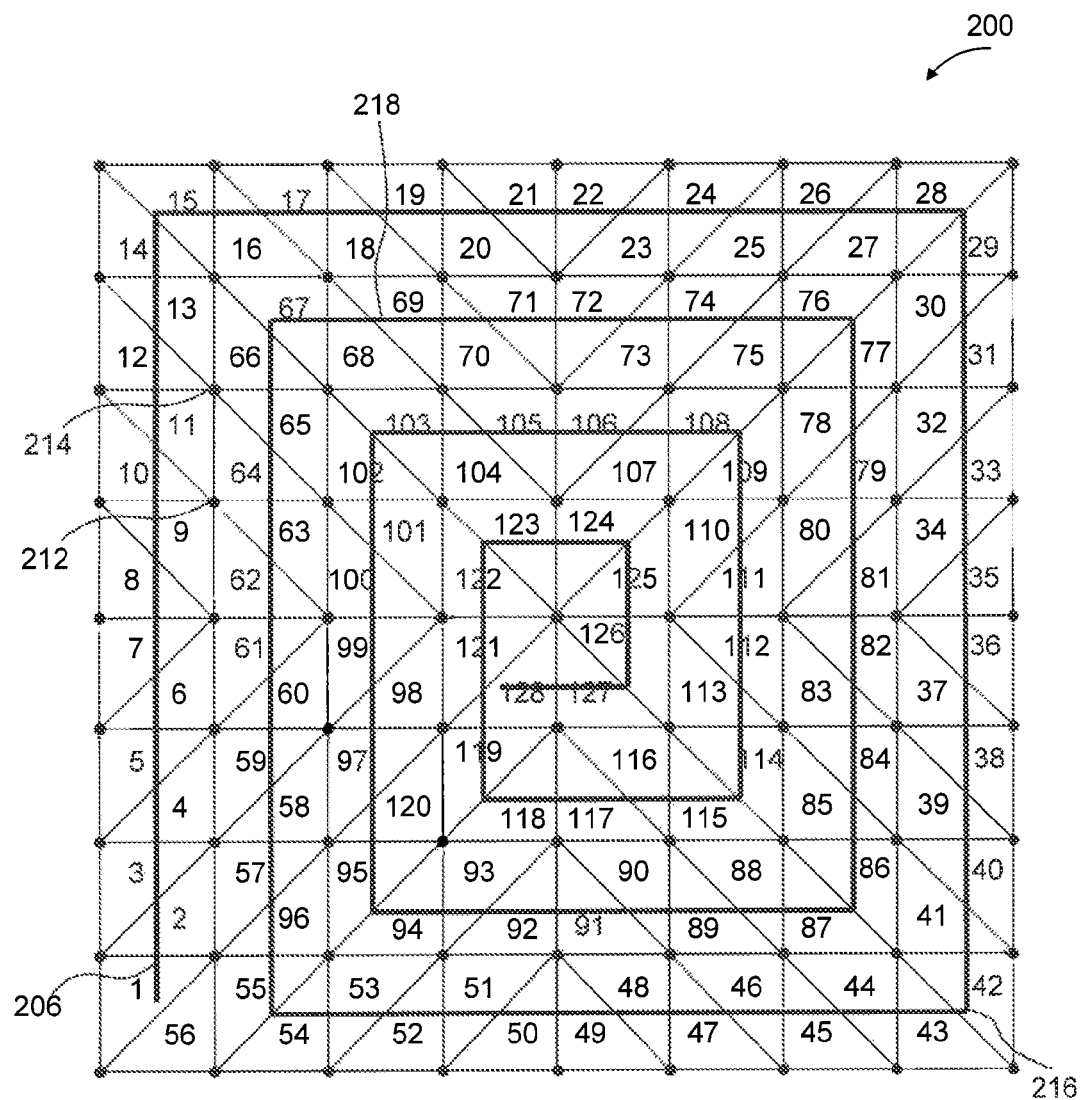
FIG. 2 is an illustration of conventional triangle generation based on a serpentine walk pattern.

FIG. 2 is an illustration of conventional triangle generation based on a serpentine walk pattern 200. In FIG. 2, vertices and triangles are generated according to a path 206. A triangle has three vertices and three sides. Vertices are points on a triangle and a side of the triangle may be a line segment that joins two vertices. The numbers illustrated in the triangles represent an order in which the triangles are generated. For example, triangle 1 is generated first, then triangle 2, then triangle 3, and so on.

The major drawback to using the conventional approach (i.e., serpentine walk pattern) of FIG. 2 is very often the same vertex requires regeneration.

For example, triangles 11 and 64 are adjacent to one another and share vertices 212 and 214. Triangle 11, positioned along outside ring 216, is generated using vertices 212 and 214. Once outside ring 216 is complete, triangles are generated along the next inside ring, for example, inside ring 218. To generate triangle 64, vertices 212 and 214 must be regenerated. This need to regenerate some vertices renders the serpentine walk pattern 200 inefficient. These inefficiencies ultimately result in slower overall frame rates.

To address this problem, an APD constructed in accordance with an embodiment of the present invention generates points and primitives using a different, more efficient, walk pattern.

Figure 3:
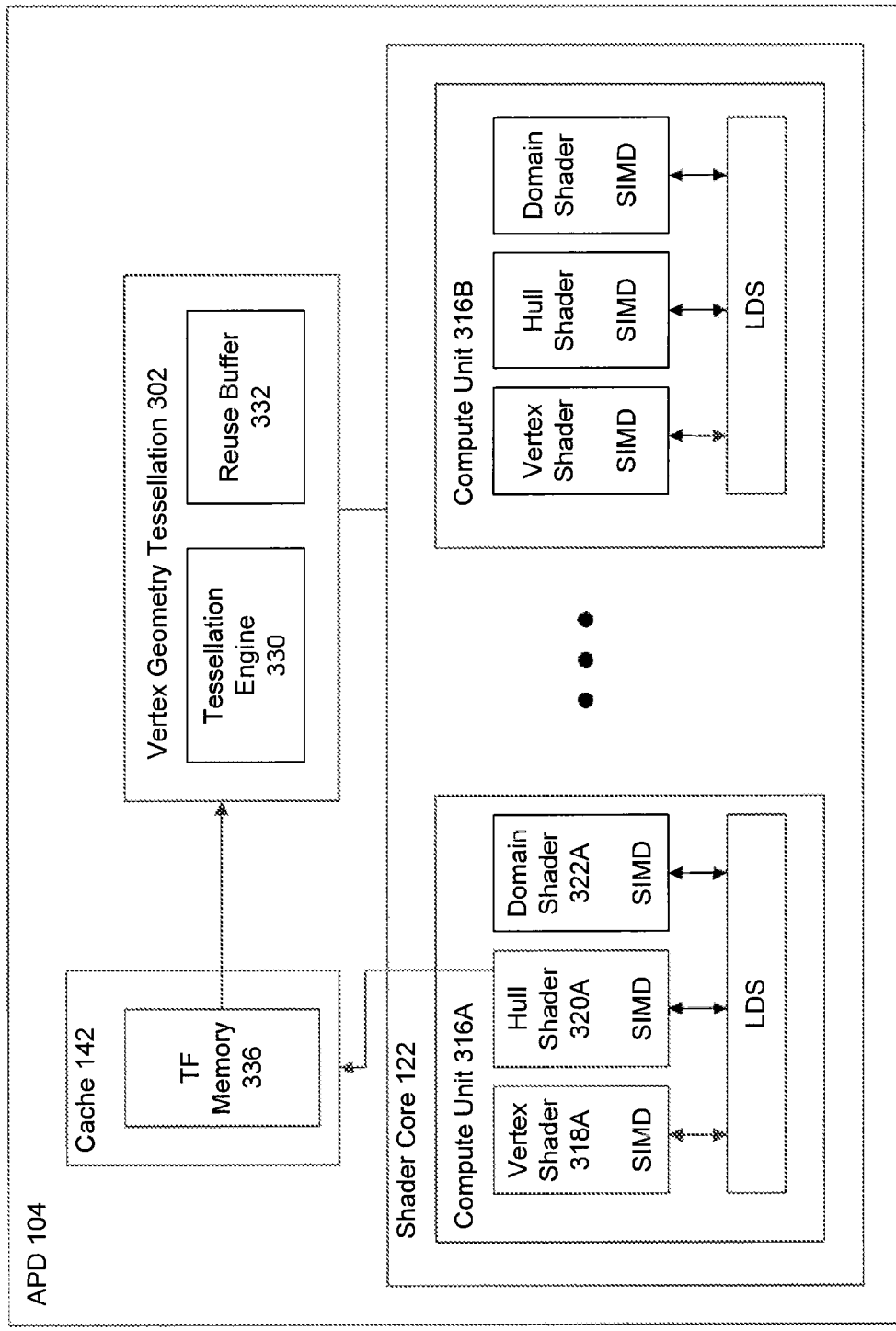
FIG. 3 is a block diagram showing greater detail of the APD illustrated in FIG. 1.

FIG. 3 is a block diagram illustration of APD 104 in FIG. 3, shown in greater detail and configured to use a more efficient walk pattern.

APD 104 includes a shader core 122, vertex geometry tessellation (VGT) 302, and cache 142. Shader core 122 of APD 104 includes a plurality of compute units 316A and 316B. Each compute unit can be associated with a vertex shader, hull shader, domain shader, and local data stores (LDSs). A compute unit can include more or fewer components than the components shown in FIG. 3.

VGT 302 includes a tessellation engine 330 and a reuse buffer 332. VGT 302 includes control logic to perform distributed tessellation. For example, VGT 302 coordinates and schedules a number of wavefronts to execute and tessellates patches. In an embodiment, VGT 302 determines which shaders, and how many, are required for execution.

In a typical sequence, APD 104 executes a vertex shader 318A, a hull shader 320A, a tessellation engine 330, and then a domain shader 322A as illustrated for compute unit 316A. During execution of the vertex shader 318A and the hull shader 320A, one or more SIMDs within each shader receives a plurality of vertices to process and will write its results into its associated LDSs. In the embodiment, hull shader 320A computes tessellation factors related to a patch to be tessellated. Upon completion, hull shader 320A may write the tessellation factors to memory (e.g., TF memory 336). During an ensuing processing stage, tessellation engine 330, for example, retrieves the tessellation factors from memory 336, which are then later used to perform tessellation.

More specifically, the hull shader 320A produces a geometry patch for each input patch (e.g., a quad, triangle, or line). Tessellation engine 330 uses the geometry patch to create smaller objects/primitives (e.g., triangles, points, lines) that are interconnected within the geometry patch. The domain shader stage then calculates vertex positions (i.e., absolute positions) for each newly-generated vertex.

By way of example, tessellation engine 330 receives work in the form of threadgroups from hull shader 320A. The threadgroups include a finite number of patches. The hull shader 320A generates tessellation factors for each patch. Based on the required number of tessellation factors, tessellation engine 330 divides the patch into a plurality of points, lines, and/or triangles based on tessellation topology. As understood by those of skill in the art, tessellation topology, as used herein, relates to the type of primitive that is generated based on the tessellation (e.g., triangle). Tessellation engine 330 generates tessellated vertices of the output patch and produces corresponding output primitives in an appropriate order based on the tessellation factors and the tessellation topology.

Figure 4:
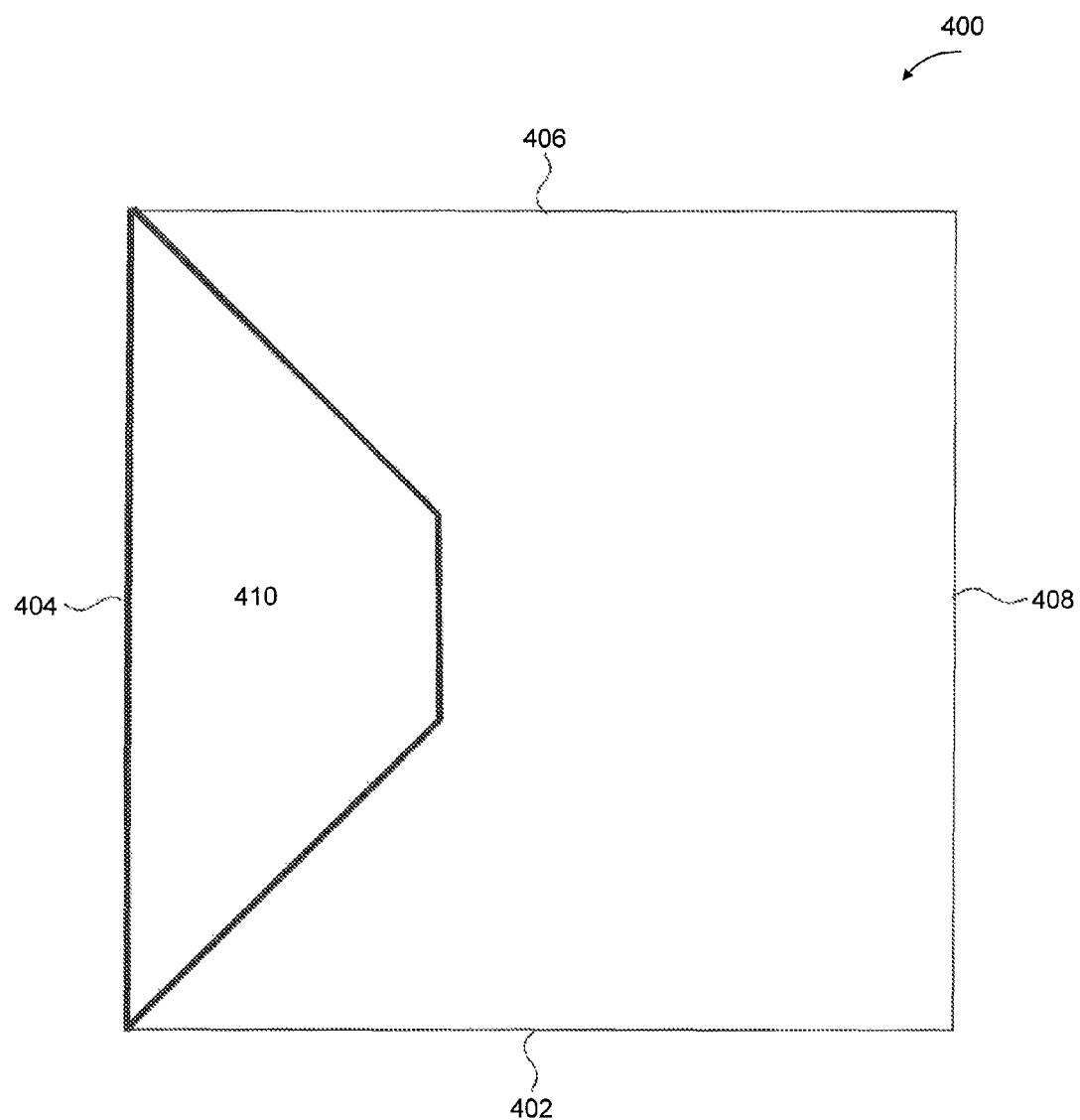
FIG. 4 is an illustration of a grid in accordance with an embodiment of the present invention.

FIG. 4 is an illustration of a grid 400 in accordance with an embodiment of the present invention. Grid 400 includes boundary edges 402, 404, 406, and 408. Grid 400 may also include sections in which vertices and primitives may be generated. For example, grid 400 comprises a section 410 that includes boundary edge 404. Boundary edge 404 is perpendicular to boundary edges 402 and 406. Tessellation engine 330 may generate, in section 410, vertices of primitives in a specific rendering order. In one embodiment, for example, tessellation engine 330 generates a set of vertices to render a section of a projected grid.

One or more vertices, of the set of vertices, is selected in a specific order based on a proximity of the vertices to a boundary edge, such as boundary edges 402, 404, 406, and 408 of the grid. Primitives are generated based on the order of the selected vertices.

Figure 5:
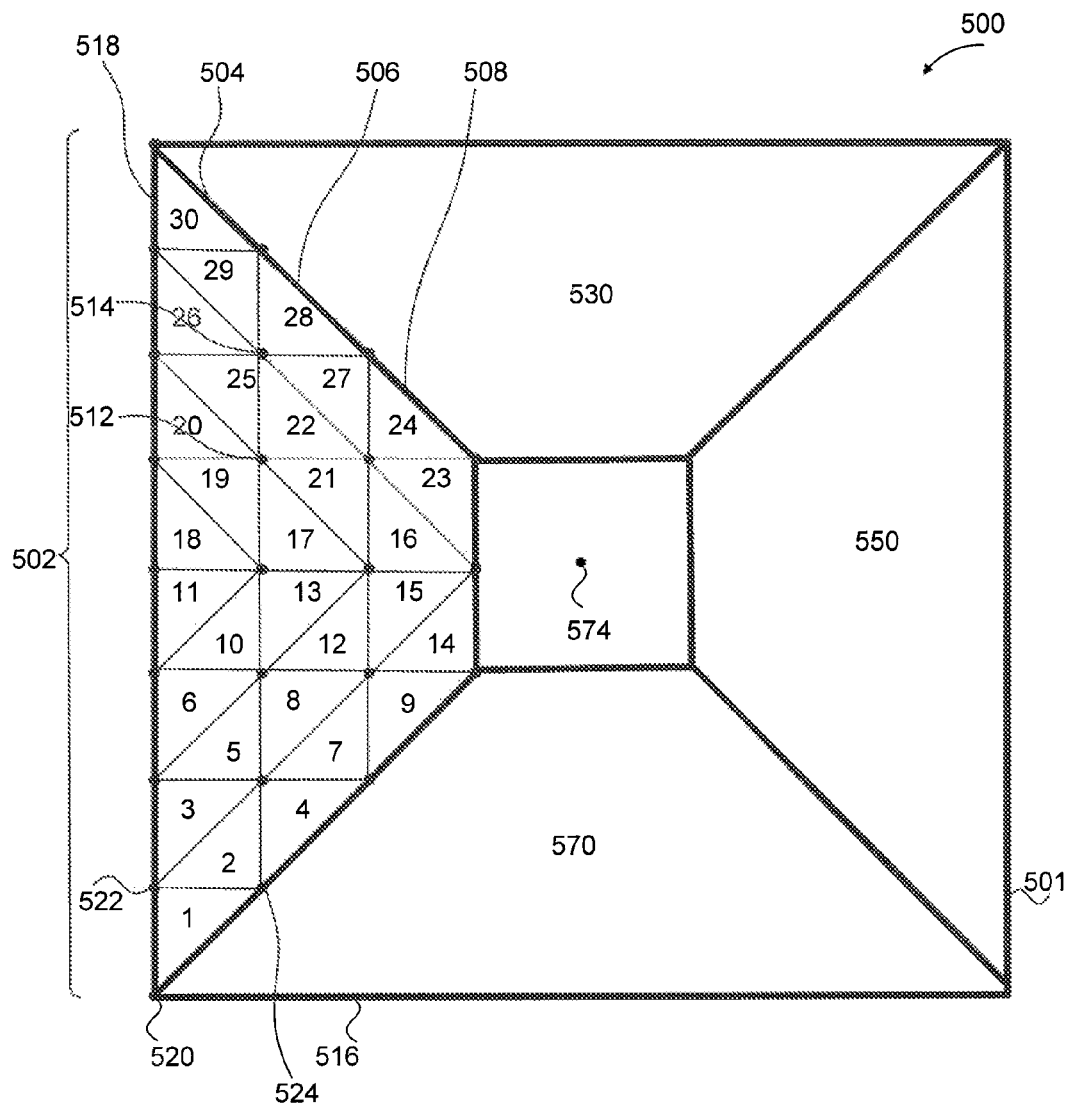
FIG. 5 is an illustration of an exemplary walk pattern for generating points and primitives in a grid in accordance with an embodiment of the present invention.

FIG. 5 is an illustration of an example walk pattern 500 for generating points and primitives in the projected grid (e.g., grid 400 in FIG. 4) in accordance with an embodiment of the present invention. A trapezoidal shaped walk pattern, as illustrated in FIG. 5, is produced. Trapezoidal shaped walk pattern 500 is produced in a way that uses computer system resources more efficiently than the conventional serpentine walk pattern 200 of FIG. 2. That is, fewer vertices per primitive are generated to produce walk pattern 500 than are required to produce the conventional serpentine walk pattern 200.

In the example of FIG. 5, tessellation engine 330 generates a set of vertices to define section 502 of grid 501. In the embodiment, tessellation engine 330 generates points and primitives based on the order of the selected vertices. Section 502 defines a first trapezoidal shaped portion of grid 501, including an outside level 504, a first inside level 506 adjacent to outside level 504, and a second inside level 508 adjacent to first inside level 506. A person of skill in the relevant art(s), however, will appreciate that grid sections and walk patterns resulting from fewer vertices per primitive than conventional walk pattern 200 can have shapes other than trapezoidal (e.g., triangular shape) and have greater or fewer than three levels. The other grid sections and walk patterns are also within the spirit and scope of the present invention.

In the embodiment, tessellation engine 330 selects one or more vertices in the set of vertices of section 502 in an order based on a proximity of the vertices to boundary edge 516 of grid 501. Boundary edge 516, bring perpendicular to edge 518, includes a first generated vertex 520. As noted above, tessellation engine 330 generates primitives based on the order of the selected vertices. The primitives are generated based on a topology (e.g., point, line, or triangle).

Tessellation engine 330 may be configured to generate primitives for a level of a grid, resulting in the generation of, for example, three levels of the trapezoid at a time, such as levels 504, 506, and 508. Generating primitives of the grid three levels at a time limits vertex reuse, and is therefore more efficient, in comparison to generating primitives one level at a time (e.g., in the serpentine walk 200). Accordingly, primitives are processed closer in time and fewer vertices are regenerated. Hardware space to store vertices costs valuable area and a tradeoff exists between storage and performance.

As mentioned above, the numbers in the triangles show an order in which the triangles are generated. For example, triangle 1 is generated first, then triangle 2, then triangle 3, and so on. Tessellation engine 330 may generate the triangles in outside level 504 (e.g., triangles 1 and 3) of the trapezoid, the triangles in first inside level 506 (e.g., triangles 4 and 7) of the trapezoid, and the triangles in second inside level 508 (e.g., triangles 9 and 14) of the trapezoid.

A proximity of a first vertex to boundary edge 516 may be the same as a proximity of a second vertex, different from the first vertex, to boundary edge 516. For example, vertices 522 and 524 are the same proximity from boundary edge 516. In an embodiment of the present invention, tessellation engine 330 selects one or more vertices in the set of vertices in an order based on the proximity of the vertices to an outside level of the grid. A primitive may be generated based on the selected vertex. For example, a triangle that is closer to outside level 504 of the trapezoid may be generated first.

For example, tessellation engine 330 may compare vertex positions in the trapezoid to determine which vertex to select. In FIG. 5, vertex 522 is closer to outside level 504 of the trapezoid compared to vertex 524. Similarly, vertex 524 is farther from outside level 504 of the trapezoid compared to vertex 522. Accordingly, tessellation engine 330 may select vertex 522 before selecting vertex 524, and generate triangle 3 based on selected vertex 522. Tessellation engine 330 may generate triangle 3 before triangle 4.

Generating triangles in levels closer to an outside edge may be advantageous because levels closer to the outside edge may have more primitives than levels farther from the outside edge. In this way, levels closer to the outside edge do not fall behind and tessellation engine 330 generates all primitives of the levels close in time to each other.

Triangles having vertices that are relatively closer to boundary edge 516 may be generated before other triangles. For example, vertex 520 is the closest in proximity to boundary edge 516. Accordingly, vertex 520 is selected and triangle 1 is generated based on vertices 520, 522, and 524. Vertices 522 and 524 are the next closest in proximity to boundary edge 516. Accordingly, vertices 522 and 524 are selected and triangle 2 is generated based on vertices 522 and 524.

The walk pattern shown in the embodiment in FIG. 5 provides for better vertex reuse such that the number of regenerated vertices is reduced. In an example, tessellation engine 300 generates triangle 25 in outside level 504 and generates triangle 22 in first inside level 506. Triangles 22 and 25 are adjacent to one another and are processed close in time. Triangles 22 and 25 share vertices 512 and 514 and when triangle 25 is generated after triangle 22, vertices 512 and 514 do not need to be regenerated. In contrast to regenerating vertices for triangle 64 in the serpentine walk pattern discussed above and shown in FIG. 2, vertices 512 and 514 are not regenerated. In an embodiment of the present invention, 1.5 primitives per vertex are generated.

In an embodiment of the present invention, tessellation engine 330 generates all vertices of the primitives in section 502 before moving to a different section such as section 530 within a second quadrant of the grid. Section 530 is adjacent to section 502. Similarly, tessellation engine 330 generates all vertices of the primitives in section 530 before moving to a different section such as section 550 within a third quadrant of the grid. Section 550 is adjacent to section 530. Similarly, tessellation engine 330 generates all vertices of the primitives in section 550 before moving to a different section such as section 570 within a fourth quadrant of the grid. Section 570 is adjacent to section 550 and.

If a quantity of levels in the section is greater than a quantity of levels generated by tessellation engine 330, tessellation engine 330 generates all vertices of the primitives in a subsection of section 502 before moving to section 530. For example, if a section has seven levels, tessellation engine 330 may generate all vertices of the primitives in the three outer most levels of the section first before moving on to the next section. Tessellation engine 330 may continue to generate all vertices of the primitives in the three outer most levels of the next section, and so on. Accordingly, tessellation engine 330 may come back around to the initial section and generate all vertices of the next three outer most levels of the primitives in the initial section. Tessellation engine may generate any quantity of levels (e.g., 1, 2, 4, 5, or more).

A special last pass occurs if any sections, including irregular areas, remain in the grid. This last pass occurs when vertices in the sections have been generated and no trapezoids remain. The vertices in the special last pass are generated in a different fashion. In this case, tessellation engine 330 processes the square in the middle. This creates a vertex 574 representing the connection of triangles in the middle of the grid, as illustrated in FIG. 5.

By way of background, tessellation engine 330 outputs vertex data and primitive data. The vertex data output from tessellation engine 330 includes edge connectivity coordinate (u, v) values. Tessellation engine 330 creates wavefronts/data to send to domain shader 322A, which generates primitive information. In the embodiment, fewer vertices are processed (e.g., 50 percent fewer vertices). Accordingly, fewer domain shader threads are generated and a reduced number of domain shaders are used to process the primitives. This approach improve is more efficient and enhances performance.

Hits in reuse buffer 332 may be optimized to provide locality of reference, thus minimizing duplicated vertices that are shared across post-tessellation primitives. Vertices previously generated by tessellation engine 330 may be stored in reuse buffer 332 for later reuse. Tessellation engine 330 may handle reuse based on the barycentric coordinates of the patch (e.g., the actual (u, v) values).

Tessellation engine 330 resends coordinates of the grid that have been reused if a distance between a current vertex and a reused vertex is more than a depth of reuse buffer 332. For example, tessellation engine 330 may send a first vertex and determine whether any subsequent points have the same coordinates as the first vertex. This determination is made by comparing the coordinate of the first vertex to coordinates of vertices stored in reuse buffer 332. If a subsequent vertex has the same coordinates, tessellation engine 330 simply does not send the subsequent vertex. This saves shader processing resources.

Figure 6:
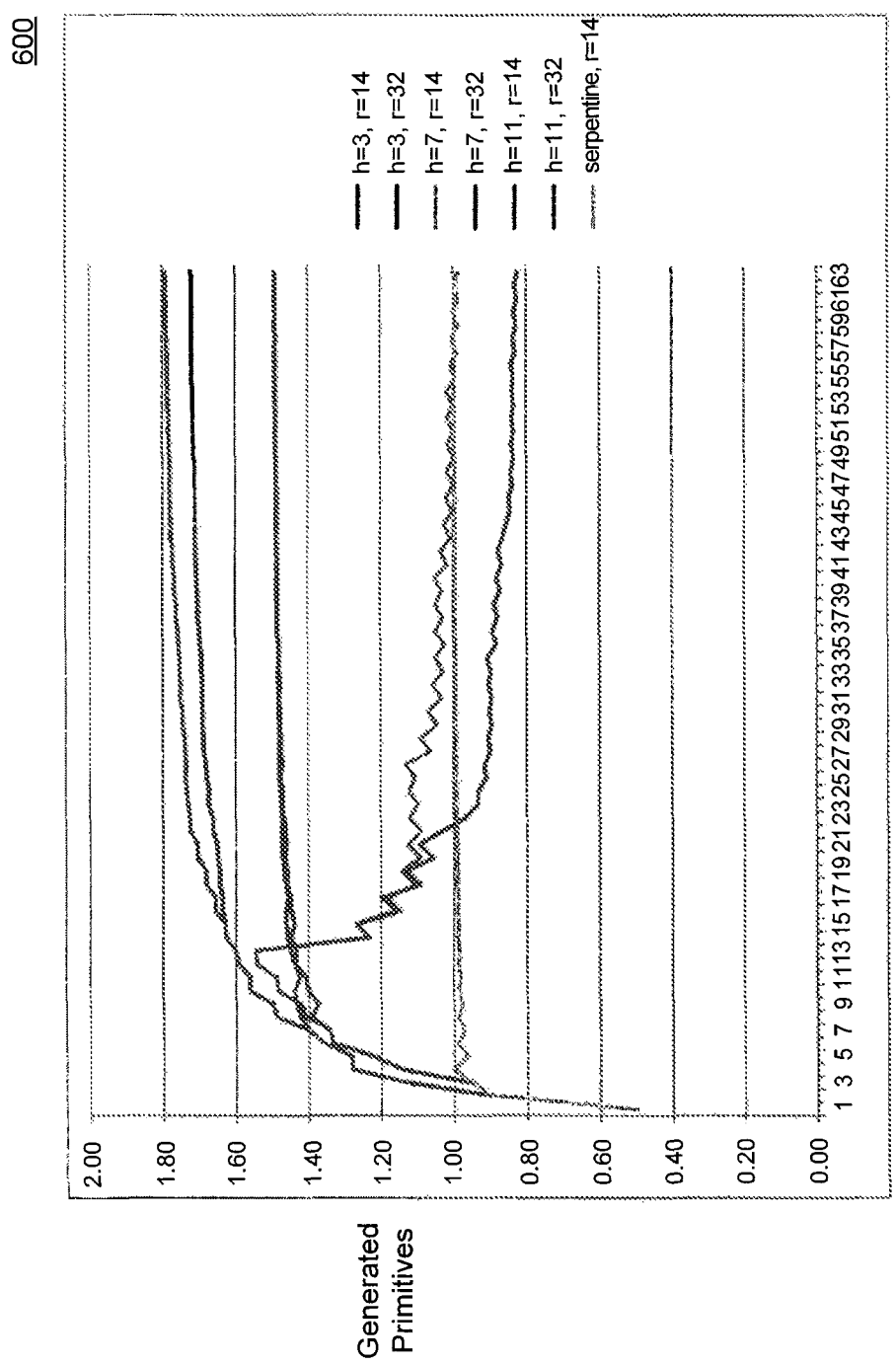
FIG. 6 is an exemplary graphical illustration of primitives and vertices generated in accordance with the walk pattern of FIG. 4.

FIG. 6 is a graphical illustration 600 of primitives generated per vertex. A variable h represents a number of levels in a section of the grid (e.g., width of the trapezoid) and r represents a depth of the reuse buffer. If r=14, the serpentine walk pattern shows an average of 1 primitive per vertex. Using the sectional walk pattern as described in this herein, an average of 1.5 primitives may be generated per vertex if h=3 and r=14.

In an embodiment, if the tessellation factor is 64, the total number of primitives generated is 8,194. If r=14, the serpentine walk pattern generates 8,222 vertices. If r=14 and h=3, the sectional walk pattern generates 5,498 vertices. The sectional walk pattern may reuse vertices without regenerating the vertices, providing an advantage over the serpentine walk pattern.

Figure 7:
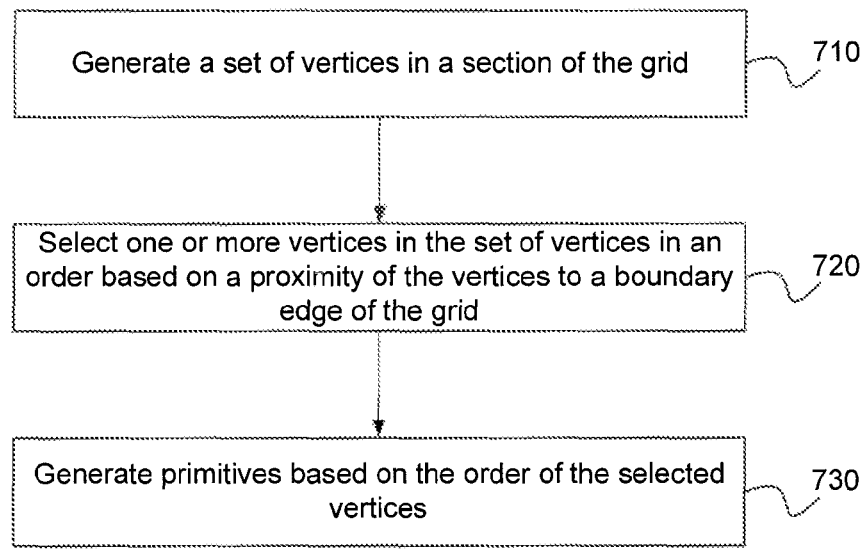
FIG. 7 is a flowchart of an exemplary method for generating primitives in a grid, according to an embodiment of the present invention.

FIG. 7 is a flowchart of an exemplary method 700 for generating primitives in a grid according to an embodiment of the present invention. Method 700 may run on APD 104, as shown in FIGS. 1-3.

In operation 710, a set of vertices is generated in a section of the grid. For example, tessellation engine 330 may generate a set of vertices in a section of the grid that might be a quadrant of the grid or could have a trapezoidal shape. The section may have any number of rows (e.g., 1, 2, 3, or more).

In operation 720, one or more vertices in the set of vertices is selected in an order based on a proximity of the vertices to a boundary edge of the grid. For example, tessellation engine 330 may select one or more vertices in the set of vertices in an order based on a proximity of the vertices to a boundary edge of the grid. Other criteria may be used to select a vertex that would be within the spirit and scope of the present invention. For example, tessellation engine 330 can also select one or more vertices in an order based on the proximity of the vertices to an outside level of the grid.

In operation 730, primitives are generated based on the order of the selected vertices. For example, tessellation engine 330 may generate primitives based on the order of the selected vertices.

Figure 8:
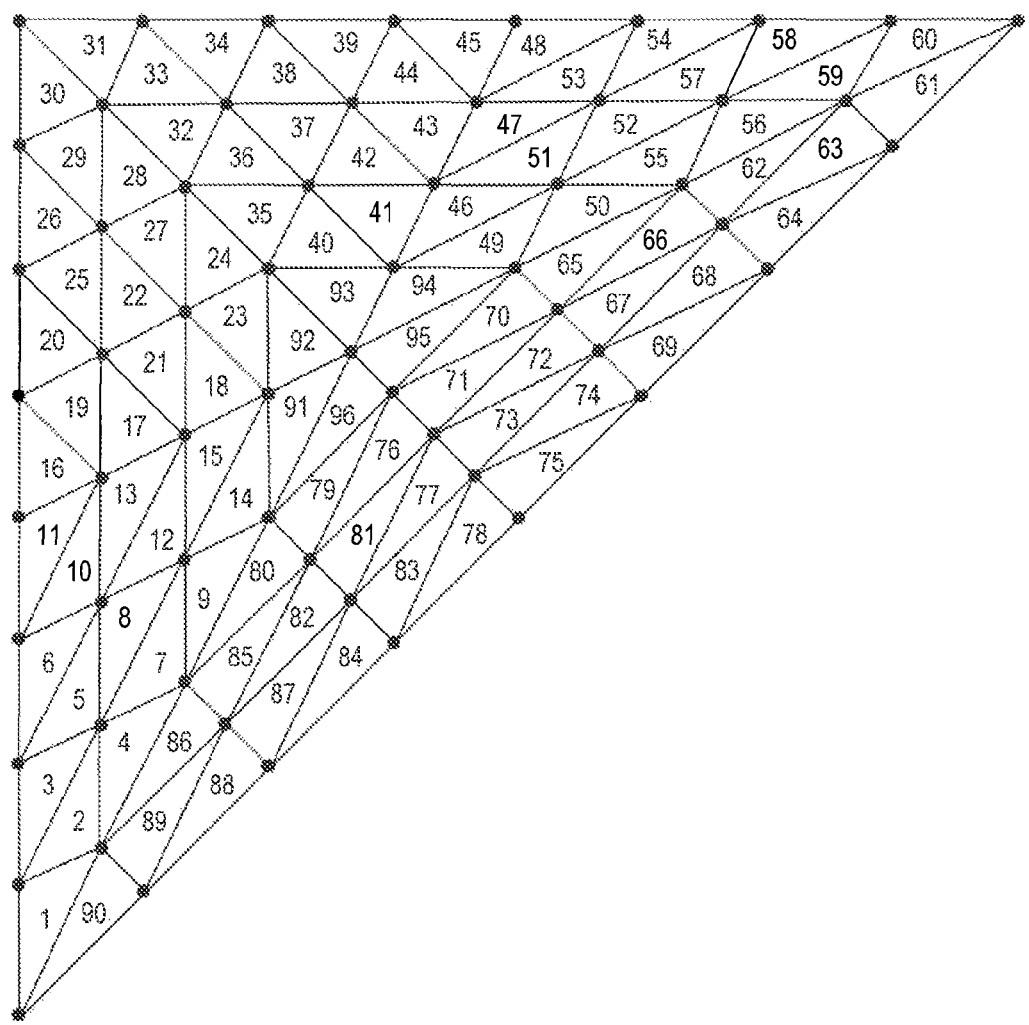
FIG. 8 is an illustration of an example walk pattern for a tri integer type grid in accordance with an embodiment of the present invention.
Figure 9:
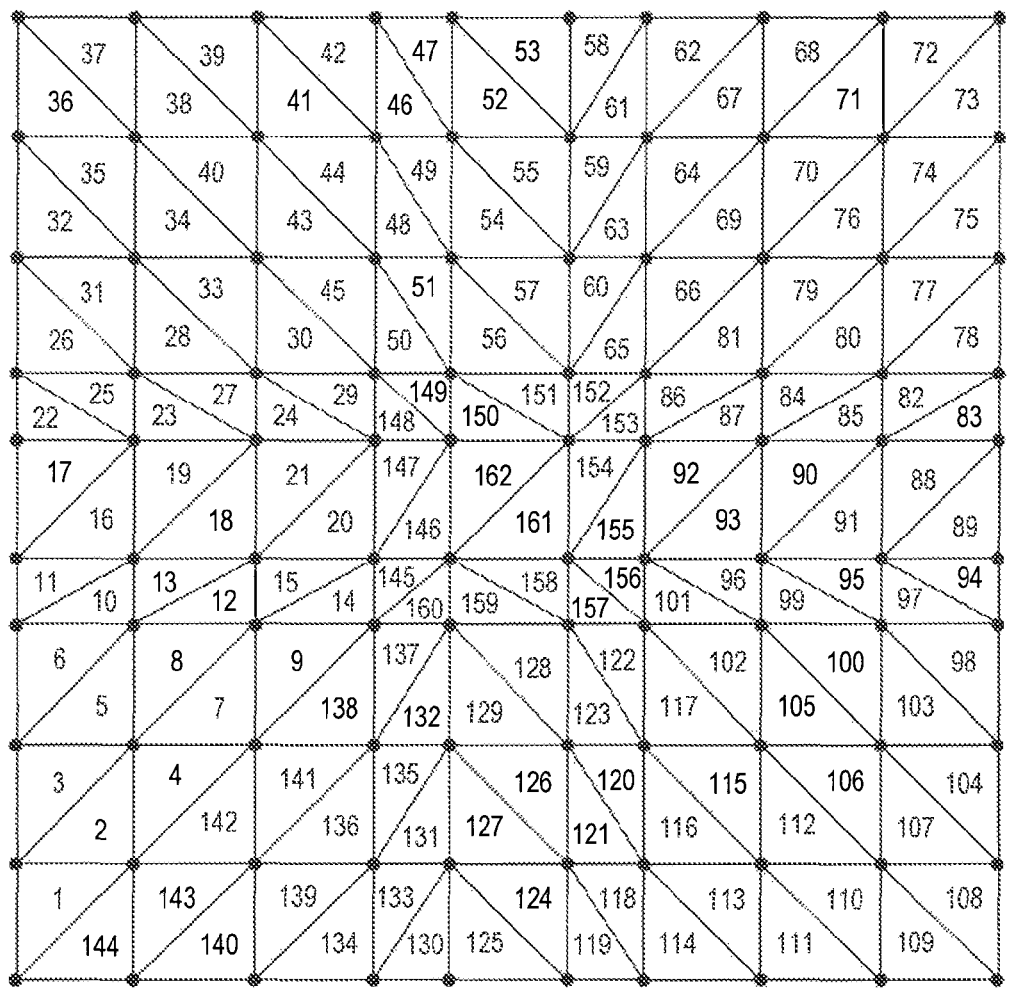
FIG. 9 is an illustration of an example walk pattern for a quad odd type grid in accordance with an embodiment of the present invention.
Figure 10:
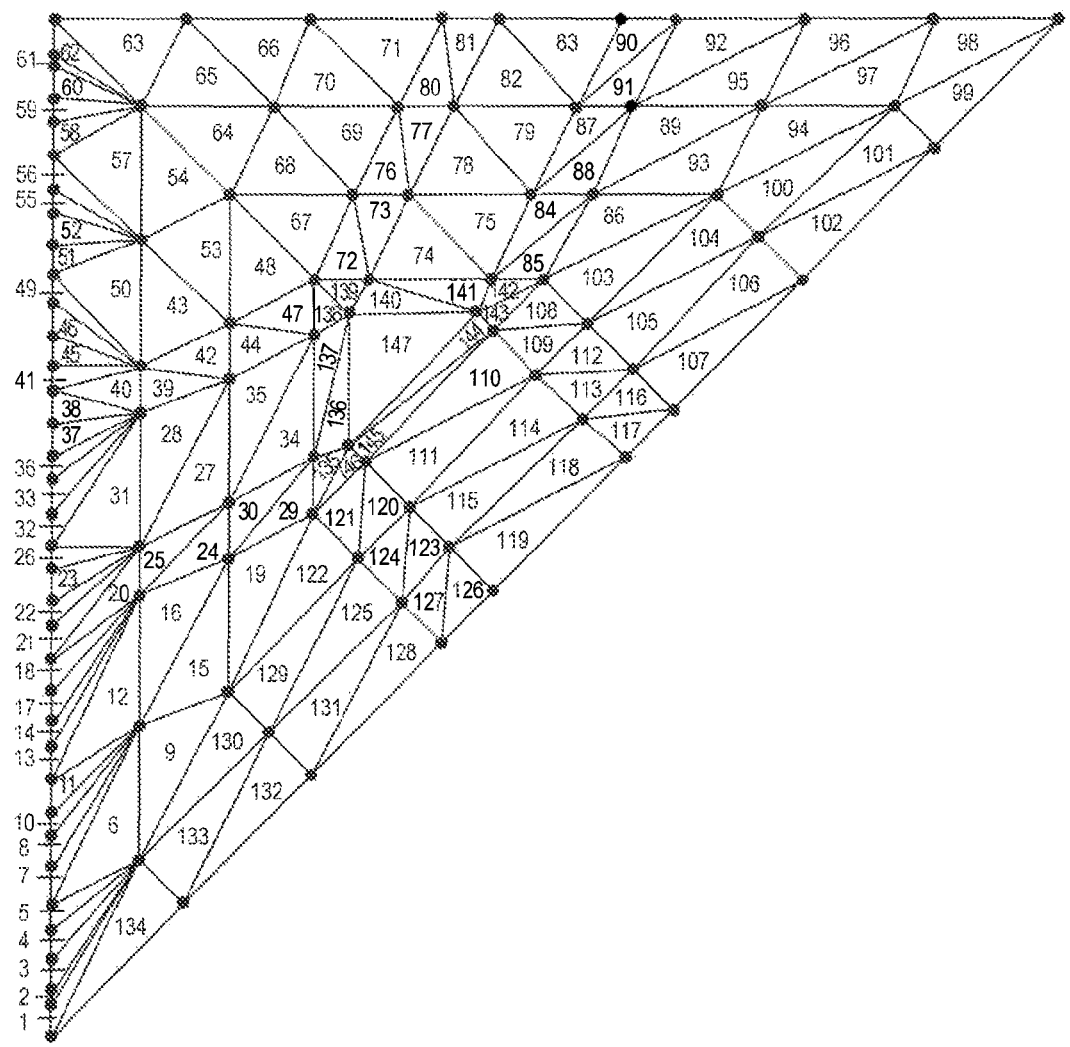
FIG. 10 is an illustration of an example walk pattern for a tri odd type grid that shows more tessellation on one edge in accordance with an embodiment of the present invention.

As noted above, FIG. 5 is an illustration of a walk pattern 500 for a quad integer grid. This is not intended to limit the invention and alternative tessellation walk patterns may be used and would be within the spirit and scope of the present invention. FIGS. 8-10 depict a few such alternatives.

FIG. 8 is an illustration of an exemplary walk pattern 800 for a tri integer type grid in accordance with an embodiment of the present invention.

FIG. 9 is an illustration of an exemplary walk pattern 900 for a quad odd type grid according to embodiments.

FIG. 10 is an illustration of an exemplary walk pattern 1000 for a tri odd type grid depicting more tessellation on one edge according to the embodiments.

Section shapes within a grid may be different, and section shapes of a grid may be based on the grid type. Further, a determination of how to divide a grid into sections may also be based on the grid type. For example, FIGS. 5 and 9 are illustrations of a quad type grid, and the grid has four sections. Similarly, FIGS. 8 and 10 are illustrations of a tri type grid, and the grid has three sections.

Further, in addition to hardware implementations of APD 104, such APDs may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein; (ii) the fabrication of the systems and techniques disclosed herein (such as, the fabrication of APD 104); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, a programmable shader being run on the APD using any shading language, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as an APD core) that is embodied in program code and may be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for generating primitives in a grid, comprising:
    generating, by a computing device, a set of vertices in a section of the grid, wherein the grid comprises multiple levels arranged adjacently along a boundary edge of the grid;
    generating, by the computing device, a rendering order for the set of vertices based on a proximity of each vertex of the set of vertices to the boundary edge of grid and a proximity of each vertex of the set of vertices to an outside level of the multiple levels;
    selecting, by the computing device, a first vertex in the set of vertices based on the rendering order;
    generating, by the computing device, multiple primitives utilizing a sectional pattern, the sectional pattern based on (i) generating, in each level of the multiple levels, primitives that share the selected first vertex, prior to selecting another vertex for additional primitive generation, and (ii) generating the primitives across the adjacent multiple levels of the grid along the boundary edge of the grid and in an order corresponding to the rendering order.

2. The computer-implemented method of claim 1, wherein the section is a quadrant of the grid and additional primitives are generated utilizing other selected vertices of the set of vertices and the sectional pattern.

3. The computer-implemented method of claim 1, wherein the section has a trapezoidal shape.

4. The computer-implemented method of claim 1, wherein the section comprises a first level, a second level, and a third level.

5. The method of claim 1, further comprising:
    comparing, by the computing device, coordinates of a current vertex to coordinates of vertices stored in a buffer; and
    sending, by the computing device, the current vertex to a connecting engine only if the current vertex coordinates fail to match the stored vertices during the comparing.

6. The method of claim 5, further comprising:
    determining, by the computing device, whether a distance between the current vertex and one or more vertices stored in the buffer is less than a reuse depth, the reuse depth indicating an available quantity of reuse buffer space; and
    reusing, by the computing device, a stored vertex corresponding to the current vertex when the distance between the current vertex and the corresponding stored vertex is less than a reuse depth.

7. A processing device for generating primitives in a grid, the processing device comprising:
    a memory; and
    at least one processor coupled to the memory and configured to:
        generate a set of vertices in a section of the grid, wherein the grid comprises multiple levels arranged adjacently along a boundary edge of the grid;
        generate a rendering order for the set of vertices based on a proximity of each vertex of the set of vertices to the boundary edge of grid and a proximity of each vertex of the set of vertices to an outside level of the multiple levels;
        select a first vertex in the set of vertices based on the rendering order; and
        generate multiple primitives utilizing a sectional pattern, the sectional pattern based on (i) generating, in each level of the multiple levels, primitives that share the selected first vertex. prior to selecting another vertex for additional primitive generation, and (ii) generating the primitives across the adjacent multiple levels of the grid along the boundary edge of the grid and in an order corresponding to the rendering order.

8. The processing device of claim 7, wherein the at least one processor is further configured to generate the set of vertices in a quadrant of the grid, and generate additional primitives utilizing other selected vertices of the set of vertices and the sectional pattern.

9. The processing device of claim 7, wherein the at least one processor is further configured to generate the set of vertices in a section having a trapezoidal shape.

10. The processing device of claim 7, wherein the at least one processor is further configured to generate a first row of primitives and a second row of primitives in the section.

11. The processing device of claim 7, wherein the at least one processor is further configured to: compare coordinates of a current vertex to coordinates of vertices stored in the buffer; and send the current vertex to a connecting engine only if the current vertex coordinates fail to match the stored vertices during the comparing.

12. The processing device of claim 11, wherein the at least one processor is further configured to:
    determine whether a distance between the current vertex and one or more vertices stored in the buffer is less than a reuse depth, the reuse depth indicating an available quantity of reuse buffer space; and reuse a vertex stored in the buffer corresponding to the current vertex when the distance between the current vertex and the corresponding vertex stored in the buffer is less than the reuse depth.

13. A non-transitory computer readable medium storing commands, wherein the commands, if executed by a processing device, cause the processing device to perform operations comprising:

generating a set of vertices in a section of the grid, wherein the grid comprises multiple levels arranged adjacently along a boundary edge of the grid;

generating a rendering order for the set of vertices based on a proximity of each vertex of the set of vertices to the boundary edge of grid and a proximity of each vertex of the set of vertices to an outside level of the multiple levels;

selecting a first vertex in the set of vertices based on the rendering order; a proximity of the vertex to the boundary edge of the grid; and generating multiple primitives utilizing a sectional pattern, the sectional pattern based on (i) generating, in each level of the multiple levels, primitives that share the selected first vertex, prior to selecting another vertex for additional primitive generation, and (ii) generating the primitives across the adjacent multiple levels of the grid along the boundary edge of the grid and in an order corresponding to the rendering order.

14. The non-transitory computer readable medium of claim 13, wherein the section is a quadrant of the grid additional primitives are generated utilizing other selected vertices of the set of vertices and the sectional pattern.

15. The non-transitory computer readable medium of claim 13, wherein the section has a trapezoidal shape.

16. The non-transitory computer readable medium of claim 13, wherein the commands, if executed, cause the processing device to perform operations comprising:

comparing coordinates of a current vertex to coordinates of vertices stored in the buffer; and sending the current vertex to a connecting engine only if the current vertex coordinates fail to match the stored vertices during the comparing.

17. The non-transitory computer readable medium of claim 16, further comprising:

determining whether a distance between the current vertex and one or more vertices stored in the buffer is less than a reuse depth, the reuse depth indicating an available quantity of reuse buffer space; and reusing a stored vertex corresponding to the current vertex when the distance between the current vertex and the corresponding stored vertex is less than a reuse depth.

* * * * *